United States Patent Office 3,132,133
Patented May 5, 1964

3,132,133
BLUE CATIONIC AZO DYE
John J. Randall, Somerville, N.J., assignor to American Cyanamid Company, New York, N.Y., a corporation of Maine
No Drawing. Filed Feb. 28, 1962, Ser. No. 176,448
4 Claims. (Cl. 260—158)

This invention is concerned with a new cationic azo dye useful for coloring substrates which have anionic sites and to the resultant colored substrates thus colored. More particularly, it relates to a quaternary salt of the formula (I)

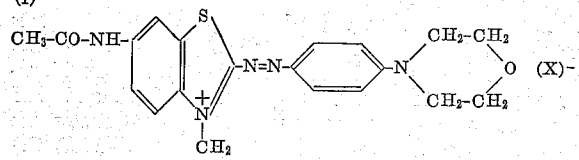

wherein $(X)^-$ is an anion. Still more specifically, these dye salts are useful for coloring blue those fibers or masses of polyacrylonitrile and other polymers which have acidic or anionic sites. Accordingly, such colored substrates also are contemplated by this invention.

Heretofore, blue dyes of the same cationic class of dyes have been prepared and dyed on polyacrylonitrile and other fibers. Unfortunately, they have been found subject to one or more major defects such as the lack of levelness in the resultant dyeings; lack of reproducibility of both hue and shade; excessive pH sensitivity and poor strippability. Another serious defect has been in their so-called "red flare." Dyes which have this defect produce dyeings of an acceptable blue in daylight but become unattractively redder under artificial light. Many prior art dyes have this defect and are unmarketable.

In accordance with the present invention a new blue dye of this class has been provided which is singularly free from these objectionable defects. It is especially outstanding in the levelness of the dyeings obtainable. This result is due to a wholly unexpected property, its relatively slow rate of dyeing.

Most cationic dyes of this general type go on the fiber at much slower dyeing rates than do any of the previously-known blues. The latter consistently dye at much faster rates, producing unlevel dyeings as do all dyes which go on the fiber too rapidly. Because of this rate differential, they are not suitable for blending with other colors to produce desirable browns, olive, navy and blue-black shades.

In view of previous experience in the art with blue dyes of these classes, it is wholly unexpected to find an excellent blue which does not have the objectionable rapidity of dyeing. The dyestuff of the present invention dyes at rates comparable with those of other shades of this class of dyes. Its dyeing rate is especially advantageous, not only because of the levelness produced, but also because it can be mixed with other cationic colors having similar dyeing rates to obtain the desired valuable mixtures, noted above.

An advantage of this invention is that the dyestuff may be prepared without unusual or difficult steps or equipment by diazotizing 2-amino-6-acetylaminobenzothiazole and coupling it in acidic solution to N-phenylmorpholine in conventional steps known in the azo art. The resultant product is dried; dissolved in a halogenated hydrocarbon, preferably monochlorobenzene; and quaternized with the desired quaterinizing agent. Among the latter suitable for the purpose may be noted dimethyl sulfate, methyl chloride, methyl iodide, methyl o- or p-toluene sulfonates or mixed o- and p-methyl toluene sulfonates, methyl perchlorate and the like. The resultant quaternized product is a dye of the structure of Formula I, above. Therein, $(X)^-$ is an anion which for the agents just named would be methyl sulfate, chloride, iodide, o- and/or p-toluene sulfonate and perchlorate respectively. Other known agents equivalent in the art may be substituted if so desired.

Dyestuff salts of this invention are generally useful for dyeing fibers composed, at least in part, of anionic polymers, i.e., thermoplastic, linear polymers having negatively charged groups substituted on the polymeric chain. These polymers are well-known in the art. In general, they are prepared either by the copolymerization or homopolymerization of an anionic group-containing-monomer. In some instances, however, they may be produced by the after-treatment of a non-ionic polymer with an agent such as a sulfonating agent. Additionally, the anionic groups which serve as dye sites may be introduced as end groups on a vinyl polymer chain by the use of a suitable polymerization initiator, such as persulfate, or by the use of a suitable chain stopper such as sulfite. In this case, it is not necessary to use an anionic monomer. However prepared, the structure of the anion is immaterial to the utility of the polymer in the present invention.

Among the suitable vinyl polymerizable anionic monomers are: styrene compounds, such as styrene sulfonic acids, styrene phosphonic acids, styrene carboxylic acids as well as the 2-methyl derivatives of these acids; sulfonic, phosphonic and carboxylic acid derivatives of such olefins as ethylene, propylene, isobutylene and the like; and free unsaturated carboxylic acids such as acrylic, methacrylic and itaconic acid.

These anionic monomers can be homopolymerized or alternatively copolymerized with non-ionic monomers to produce the aforementioned polymers having a sufficient proportion of anionic sites to be dyed with the cationic dyestuff compositions of this invention. Among the non-ionic monomers which can be usefully copolymerized are nitriles such as acrylonitrile and vinylidene dinitrile; unsaturated alcohols such as vinyl alcohol, allyl alcohol, methallyl alcohol, allyloxyethanol and α-hydroxymethyl-acrylonitrile; halides such as vinyl and vinylidene chlorides and fluorides; olefins such as styrene and butadiene; esterified carboxylic acids such as vinyl acetate, vinyl chloroacetate, vinyl formate, vinyl propionate, allyl chloroacetate, methyl acrylate, methyl methacrylate, methyl α-acetaminoacrylate, methoxyethyl acrylate, methyl α-chloroacrylate, dimethyl fumarate and 3-methylene-phthalides; amides such as acrylamide, N-dimethylacryl-amide, N-dimethylaminopropylacrylamide and N-2-hydroxyethyl)acrylamide; and ethers such as vinyl methyl, vinyl ethyl and allyl glycidyl ethers.

The anionic copolymers can also be of the condensation polymer type. Important examples of these are polyamides, polyurethanes, and polyesters. Such polymers are usually formed from polyalcohols and polyamines by condensation with polyacids and polyisocyanates. The anionic groups can be introduced as an anionic substituent present in one of the reactants. For example, in the preparation of poly(ethylene terephthalate), incorporation of a small amount of sulfotereph-thalic acid results in the formation of a polymer containing sulfonic acid substituents. Alternatively, as noted above, non-ionic condensation polymers can be rendered anionic by suitable after-treatment, e.g. sulfonation.

While the dyestuffs of the present invention can be used to dye polymers having even a small number of anionic sites recurring throughout the polymeric chain, for practical purposes the fibers should be composed of polymers in which the anionic groups are present to the extent of at least 10 millimoles per kilogram of polymer and preferably in the range of from about 25 to 100 millimoles per kilogram. Even higher concentrations may be present, but are not necessary.

Many examples of the aforementioned anionic polymers are commercially available. Typical illustrative products include the following:

(1) Acrylonitrile-methylmethacrylate copolymers having terminal anionic groups introduced by the polymerization catalyst and/or chain-stopper;

(2) Acrylonitrile-methylvinylpyridine-vinyl acetate terpolymers with anionic end groups;
(3) Acrylonitrile-styrene sulfonic acid copolymers (cf. U.S. Patent No. 2,837,500);
(4) Acrylonitrile - methylmethacrylate - styrenesulfonic acid terpolymers (cf. U.S. Patent No. 2,837,501);
(5) Acrylonitrile-vinylidene chloride-polyvinyl-pyrrolidone terpolymers with anionic end groups;
(6) Acrylonitrile-vinyl chloride copolymers with anionic end groups;
(7) Vinylidene dinitrile-vinyl acetate copolymers with anionic end groups; and
(8) Ethylene glycol, terephthalic acid or dimethyl terephthalate and sulfoterephthalic acid condensation polymers.

Fibers of polyacrylonitrile in which the acrylonitrile monomer has been copolymerized with an acidic or anionic monomer or has anionic end groups such as the illustrative products listed above may be advantageously dyed with the dye of this invention. Excellent affinity, levelness and a brilliant blue hue are obtained.

Although the principal advantage of the dyestuff of this invention perhaps is in the levelness of the resultant dyeings, it has many other advantageous properties. It does not stain acetate. It is strippable in the presence of sodium chloride for the correction or control of shade during commercial dyeing. It can be applied with various acids in the dyebath such as acetic, formic or sulfuric. Hues and shades obtained with any of these acids are uniform. The product dyeings are reproducible.

The invention will be further discussed in conjunction with the following examples which are intended as illustrative only. Therein, unless otherwise noted, all parts and percentages are by weight and temperatures are expressed in degrees centigrade.

EXAMPLE 1

*Preparation of the Unquaternized Dyestuff*

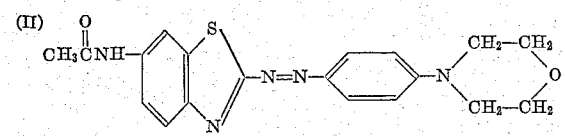

20.7 parts of 2-amino-6-acetylaminobenzothiazole are slurried in 75 parts by volume of 90% formic acid and added to a solution of 0–5° C. prepared by mixing: 110 parts (60 parts by volume) of conc. C.P. sulfuric acid with 50 parts water and cooling to minus 5° to 0° C. The whole is cooled to minus 5° to 0° C. 7.0 parts of sodium nitrite are dissolved in 50 volume parts water and added to the above solution over a half hour period, keeping the temperature at 0° to minus 5° C. Stir ½ hour at minus 5° to 0° C. When diazotization is complete, ice is added to double the volume. 16.3 parts of N-phenylmorpholine are dissolved in 120 parts of glacial acetic acid, adjusted to 0° to minus 5° C. and added to the slurry of diazo. The whole is diluted to two thousand volume parts with water and stirred one half hour. 100 parts of sodium acetate are added to bring the pH up to 1.0. After further stirring the product is isolated by diluting with water to three thousand volume parts. 200 parts by volume of conc. C.P. ammonium hydroxide solution is added. The product is filtered, washed with water (until the filtrate is free of mineral acidity) and dried at 100° C. The yield is about 79.2% of theory.

EXAMPLE 2

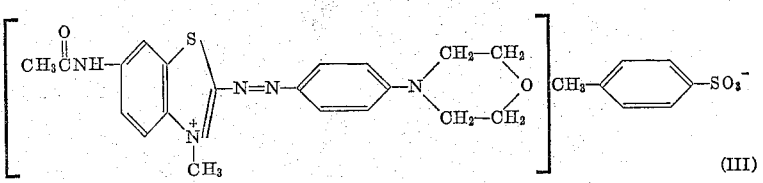

25 parts of the product of Example 1 and 650 parts of monochlorobenzene are heated to the boil (134° C.) and the water stripped off with 50 parts of monochlorobenzene. The residue is cooled to 110° C. and 62.5 parts of mixed methyl o- and p-toluene sulfonates are added. The whole is heated at reflux (110°–115° C.) until quaternization is complete (about 5 hours). The product precipitate is collected; washed with 150 parts of cold monochlorobenzene; reslurried in 300 parts monochlorobenzene; boiled 15 minutes; filtered and again washed with cold monochlorobenzene.

To purify the product, 5 parts are dissolved at 70° C. in 200 parts glacial acetic acid and filtered hot. To the filtrate, with stirring, is added 500 parts of tetrahydrofuran. Then 50 parts heptane is added. The product precipitate is collected, washed with 100 parts of tetrahydrofuran and 50 parts of heptane and dried at 75° C. The yield is 3.1 parts.

EXAMPLE 3

Example 2 is repeated, substituting for the mixture of methyl o- and p-toluene sulfonates with equal volumes of the ortho and para isomers. Similar dye salts are obtained in good yields.

EXAMPLE 4

The dye salt of Example 2 is reduced to minus forty mesh (U.S. Standard) and formed into the following mixture:

|  | Parts |
|---|---|
| Dye salt | 2.0 |
| Sulfamic acid | 2.8 |
| Surfactant [1] | 1.3 |
| Boric acid | 20.6 |
|  | 26.73 |

[1] A non-ionic polyoxyethylene ether commercially purchased as Renex 33.

The mixture is passed through a twenty-mesh (U.S. Standard) screen.

One part of the resultant blend is dissolved in 500 parts of water. Of this, 50 parts of dye solution is used, together with 150 parts of water for a dyebath. To it is added 1 part of 10% sodium chloride solution and 2 parts of a 5% solution of 28% acetic acid. To this is added three 5 gram wet-out skeins of fibers of a copolymer of 94% acrylonitrile and 6% methyl acrylate. The bath is heated to 200° F. and maintained at 200° F. for one hour. The skeins are removed, washed with water, soaped at 160° F. in a 0.1% soap solution for 2–5 minutes, then washed with water and dried. Resultant dyeings are good, level, full blue shades.

EXAMPLE 5

Example 2 is repeated replacing the mixed methyl o- and p-toluene sulfonates with the quantities of the methylating agents listed below. Dyeings are made as in Example 4. Polyacrylonitrile having anionic sites is dyed similar blue shades.

| Methylating Agent | Quantity Used in Parts by Weight | Polyacrylonitrile Colored |
|---|---|---|
| Dimethyl sulfate | 42 | Blue. |
| Methyl iodide | 58 | Blue. |

The perchlorate salt wherein $X^-=ClO_4^-$ is prepared by adding an equimolecular amount of perchloric acid to an aqueous acidic solution of the methylsulfate salt wherein $X^-=CH_3SO_4^-$.

I claim:

1. The compound of the formula

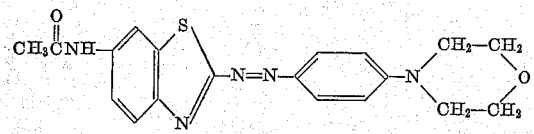

2. A dyestuff of the formula

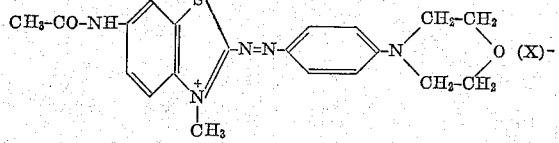

wherein $(X)^-$ is an anion.

3. A dyestuff according to claim 2 wherein $(X)^-$ is a methylsulfate anion.

4. A dyestuff according to claim 2 wherein $(X)^-$ is a toluene sulfonic acid anion.

References Cited in the file of this patent

UNITED STATES PATENTS

| 2,687,938 | Chaney et al. | Aug. 31, 1954 |
| 2,832,764 | Huenig | Apr. 29, 1958 |
| 2,840,443 | Smith | June 24, 1958 |
| 2,889,315 | Bossard et al. | June 2, 1959 |
| 3,069,408 | Merian et al. | Dec. 18, 1962 |

FOREIGN PATENTS

| 556,218 | Canada | Apr. 12, 1958 |
| 787,369 | Great Britain | Dec. 4, 1957 |
| 1,151,304 | France | Aug. 19, 1957 |
| 1,254,350 | France | Jan. 9, 1961 |